Sept. 26, 1967      G. J. SNYDER      3,343,703
TANK CONSTRUCTION
Filed Jan. 18, 1965
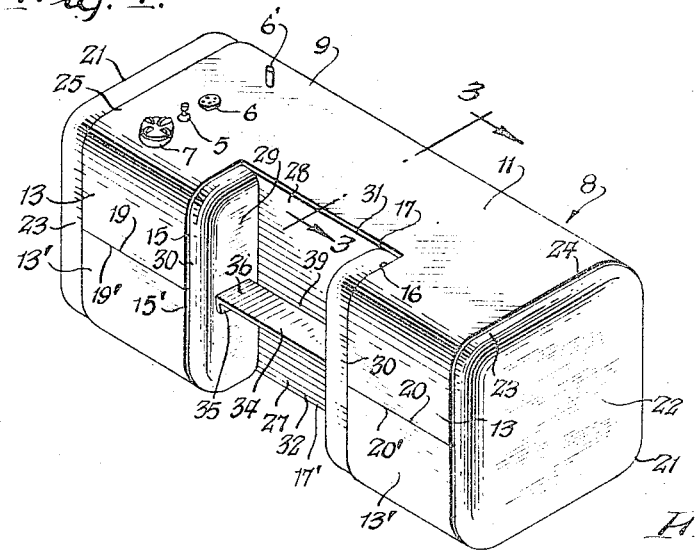
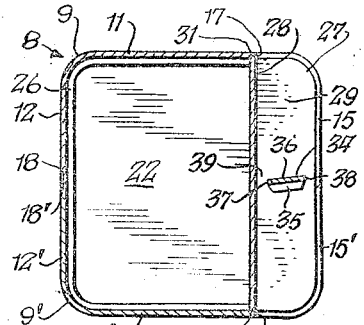
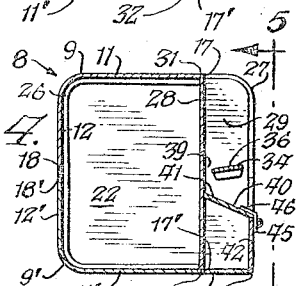
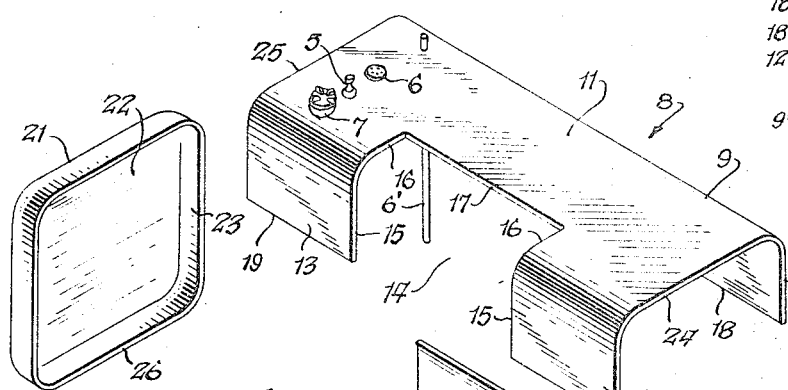
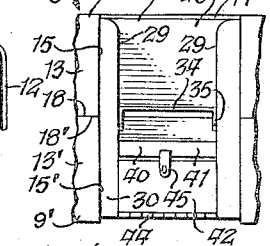
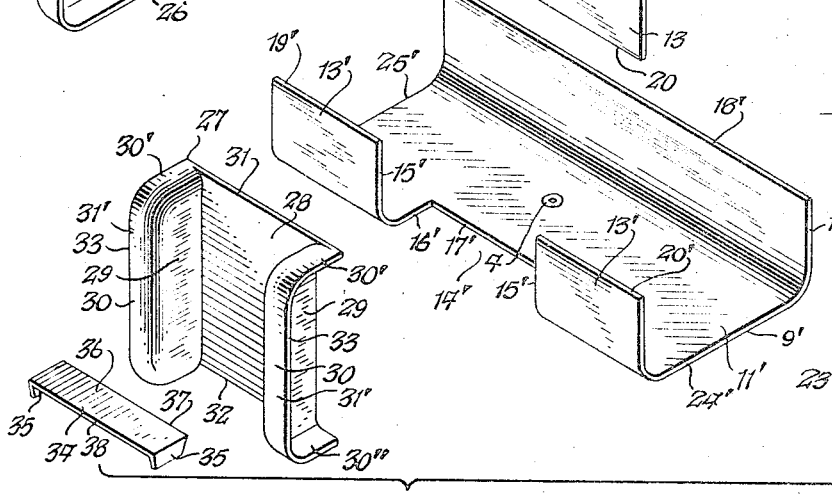
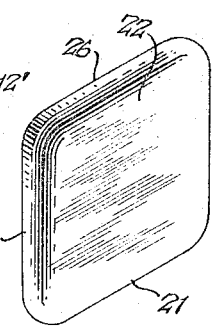
INVENTOR.
GERALD J. SNYDER
BY Popp and Sommer
ATTORNEYS

United States Patent Office 3,343,703
Patented Sept. 26, 1967

3,343,703
TANK CONSTRUCTION
Gerald J. Snyder, 7213 Old Lakeshore Road,
Lake View, N.Y. 14085
Filed Jan. 18, 1965, Ser. No. 426,046
14 Claims. (Cl. 220—1)

The present invention relates to a liquid tank and more particularly to an improved combined liquid tank and step.

It is common to mount a fuel tank on the side of an automotive tractor and utilize a portion of the tank as a step for climbing onto the vehicle. In the past a step of the foregoing type was generally exposed to the elements and tended to accumulate precipitation. In addition the tanks incorporating steps were of relatively complex shape and therefore difficult to fabricate. It is with the overcoming of the foregoing shortcomings that the present invention is concerned.

It is accordingly one object of the present invention to provide a combined liquid tank and step which can be fabricated simply from sheet materials. A related object of the present invention is to provide an improved liquid tank having a recess therein which can be fabricated in an extremely simple manner.

Another object of the present invention is to provide an improved combined liquid tank and step wherein the step is located within a recess in the tank and is thereby partly sheltered from debris and the like which may be thrown up by the vehicle wheels. A related object of the present invention is to provide a combined liquid tank and step wherein the tank is of such a construction so as to permit the step to be placed at any desired elevation during the process of fabrication to thereby permit the tank to be conveniently tailored for different sizes and models of vehicles. A further related object of the present invention is to provide a combined liquid tank and step wherein the step is associated with the tank in such a manner that it will shed precipitation and thus tend to prevent the accumulation thereof on the step.

A further object of the present invention is to provide an improved combined liquid tank, step, and container wherein the container and liquid tank contain a common wall which reduces the fabrication costs. A related object of the present invention is to provide a combined liquid tank and container wherein the container is located within the general outer periphery of the tank and therefore does not protrude. Other objects and attendant advantages of the present invention will readily be perceived hereafter.

The improved liquid tank of the present invention comprises the following parts all fabricated from suitable plate metal: An upper body section, a lower body section secured to the upper body section in fluid tight relationship, as by welding, end caps at the ends of the body sections, and an insert providing an indentation, said insert being installed in fluid tight relationship in cut away portions of the upper and lower body sections. Suitable flanges on the end caps and on the insert are secured to the upper and lower body sections and tend to reinforce such sections against separation. The insert, which provides the indentation, has parallel sides on which a step can be mounted at any desired elevation. The step is spaced from the back of the insert and is tilted rearwardly with respect thereto to provide for good drainage of precipitation which falls on the step. In accordance with another embodiment of the present invention a container for flares, tools, or the like, is located underneath the step with walls of the tank and the container being common to both. The present invention will be more fully understood when the following portions of the specification are read in conjunction with the accompanying drawings wherein:

FIG. 1 is a perspective view of the improved liquid tank of the present invention;

FIG. 2 is an exploded view showing all parts of the improved liquid tank of the present invention;

FIG. 3 is a cross sectional view taken substantially along line 3—3 of FIG. 1;

FIG. 4 is a cross sectional view similar to FIG. 3 but showing a modified form of the present invention; and FIG. 5 is a fragmentary view taken substantially along line 5—5 of FIG. 4.

The improved liquid tank 8 includes an upper body section 9 having a planar top wall 11, a rear wall 12 extending substantially perpendicularly thereto, and a front wall consisting of portions 13 extending substantially perpendicular to top 11. Portions 13 are separated by cut away portion or recess 14 bounded by edges 15 of front wall portions 13 and edges 16 and 17 of top wall 11. It will readily be appreciated that upper body section 9 can be fabricated from a planar piece of metal which is suitably cut and bent. Cap 7, liquid gauge flange 6, suction line 6' and vent 5 are located in top wall 11. Drain plug 4 is located in the bottom wall 11'.

The lower body section 9' is a mirror image of upper body section 9 and all parts designated with a primed numeral corresponding to the unprimed numerals of the upper body section denote corresponding parts.

During the process of fabrication edge 18 of upper body section 10 and edge 18' of lower body section 10' are placed in abutting relationship (FIG. 3). Edges 19 and 19' and 20 and 20' are also placed in abutting relationship, and the seams 18–18', 19–19' and 20–20' are secured to each other in fluid tight relationship by suitable welding.

An insert 27 having a back wall 28 and side walls 29 extending substantially perpendicularly thereto is slipped into cut away portions 14 and 14' so that it occupies the position shown in FIGURE 1. Flanges 30, which extend substantially perpendicularly to side walls 29 lie inside of the adjacent edges of sections 9 and 9'. Upper and lower edges 31 and 32 are welded to edges 17 and 17', respectively, of the upper and lower body sections, and a weld is provided joining edges 15 and 15' to flanges 30 to thereby secure insert 27 to upper and lower body sections 9 and 9' in fluid tight relationship. It is to be noted that flanges 30 have upper portions 30' and lower portions 30'', both extending substantially perpendicularly to central portions 31' thereof. A portion of flanges 30 lie within the joined body sections, as can be seen from FIGURE 1, to provide a lapped joint.

After the foregoing assembly has been made, caps 21 having planar faces 22 and flanges 23 extending substantially perpendicularly thereto are slipped into the joined upper and lower body sections, and the end caps 21 are secured to the joined upper and lower body sections 9 and 9' by welding flanges 23 to assembled sections 9 and 9' at edges 24–24' and 25–25', as can be seen from FIG. 1, to thereby provide a lapped joint.

It can readily be seen that each of the above described five components of the tank can be fabricated from planar stock in an extremely simple manner by conventional fabrication techniques, and their assembly is likewise effected by conventional welding.

Further, in accordance with the present invention a step 34 is provided with downwardly turned flanges 35 at opposite ends thereof. It will be appreciated that since side faces 29 of insert 27 are parallel, step 34 may be located at any desired position within these faces to thereby permit the step to be placed at any desired elevation to best suit the vehicle on which tank 8 is to be installed. Thereafter end flanges 35 of step 34 are welded to sides 29 in its desired position.

It is to be noted from FIGURE 3 that upper surface 36 of step 34 is tilted rearwardly toward back wall 28 of insert 27 and that inner edge 37 of step 34 is lower than outer edge 38 of step 34 and that edge 37 is spaced from wall 28 by space 39. Thus, any precipitation to which step 34 is subjected may drain downwardly toward back wall 28 and then through space 39 between edge 37 and wall 28. If desired, the upper surface 37 of step 34 may be perforated to further enhance drainage. Thus the step will tend, by virtue of its inclination, to prevent the accumulation of precipitation thereon. It will also be noted that the recess in which insert 27 is placed further shields step 34 from liquid, mud, and the like, which may be thrown up by the wheels of a vehicle on which tank 9 is mounted.

In FIGURES 4 and 5 an alternate embodiment of the present invention is disclosed wherein a storage compartment for tools, flares, or the like, is located beneath step 34. Otherwise the liquid tank is identical in all respects to that described above with respect to FIGURES 1–3. The storage container 40 includes a top wall 41, an outer wall 42 and a bottom wall 43. Outer wall 42 is hinged to bottom wall 43 at 44 to act as a door and a hasp 45 is provided for receiving a lock or the like to maintain door 42 in a closed position such as shown, hasp 45 having portion 46 secured to top wall 41. It is to be especially noted that the vertical side walls 29 and back wall 28 are common to both the liquid tank 8 and storage container 40 and further that container 40 lies within the confines of insert 27. Thus, container 40 is not only unobtrusive but also utilizes portions of liquid tank 9 as portions of itself, thereby reducing fabrication costs. It is to be also noted that top wall 41 of container 40 slopes downwardly away from back wall 28 so that any precipitation falling on top 40 will tend to flow downwardly away from back wall 28 and therefore tend not to be stored on the container so that it will not accumulate proximate step 34.

It is to be noted that top wall 41 and bottom wall 43 may have flanges (not shown) at opposite ends thereof and at the edges thereof contiguous to back wall 28 to facilitate their installation by welding or the like within insert 27.

While preferred embodiments of the present invention have been disclosed it will be appreciated that the present invention is not limited thereto but may be otherwise embodied within the scope of the following claims.

I claim:

1. A liquid tank comprising an upper body section, a lower body section secured to said upper body section in fluid tight relationship, first and second end sections secured to said upper and lower body sections in fluid tight relationship, a first cut away section in said upper body section, a second cut away section in said lower body section, first edge portions defining said first cut away section, second edge portions defining said second cut away section, said first and second cut away sections being located in contiguous relationship to each other, and an insert portion secured to said first and second edge portions in fluid tight relationship, said insert portion providing an indentation within said tank.

2. A liquid tank as set forth in claim 1 wherein said insert portion includes a vertical back wall and a pair of vertical side walls secured thereto, said vertical side walls extending transversely to said vertical back wall.

3. A liquid tank as set forth in claim 2 including a step having opposite end portions secured to said opposite side walls.

4. A liquid containing tank as set forth in claim 3 wherein said side walls have a first width and wherein said step has a second width which is less than said first width.

5. A liquid containing tank as set forth in claim 4 wherein said step has an outer edge and an inner edge and wherein said inner edge is spaced from said back wall of said insert to permit precipitation to drain between said inner edge and said back wall.

6. A liquid containing tank as set forth in claim 5 wherein said outer edge of said step is elevated above said inner edge to thereby permit drainage of precipitation rearwardly toward said back wall.

7. A liquid containing tank as set forth in claim 5 including a box-like member located below said step with said side walls of said insert being common to both said tank and said box-like member, said box-like member in addition having a bottom, a top, and door means for permitting access into said box-like member.

8. A liquid containing tank as set forth in claim 7 wherein said box-like member includes a top lying below said step, said top having a rear edge contiguous to said back wall of said insert and a front edge remote therefrom, with said rear edge being elevated above said front edge to thereby cause precipitation to drain downwardly and away from said back wall of said insert.

9. A liquid containing tank as set forth in claim 8 wherein said back wall of said insert both forms a wall of said tank and a wall of said container mounted thereon.

10. A liquid tank comprising an upper body section having a top wall having first and second edges and first and second ends, a first wall formed integrally with and extending downwardly from said first edge, a second wall formed integrally with and extending downwardly from said second edge, a first cut away portion dividing said second wall and extending into said top wall, said first cut away portion being defined by first cut away edge portions, a lower body section including a bottom wall having third and fourth edges and third and fourth ends, a third wall formed integrally with and extending upwardly from said third edge, a fourth wall formed integrally with and extending upwardly from said fourth edge, said fourth wall including a second cut away portion dividing said fourth wall and extending into said bottom wall, said second cut away portion being defined by second cut away edge portions, said first and third walls being joined to each other in liquid tight relationship and said second and fourth walls being joined to each other in liquid tight relationship, a first end plate attached in fluid tight relationship to said first and third ends, a second end plate attached in fluid tight relationship to said second and fourth ends, and an insert having a peripheral edge attached in fluid tight relationship to said first and second cut away edge portions to provide a recess within said tank.

11. A liquid tank as set forth in claim 10 wherein said insert includes a pair of opposed substantially vertical side walls, and step means having opposite end portions secured to said side walls.

12. A liquid tank as set forth in claim 11 wherein said first and second end plates each include a face portion and first flange portions extending substantially perpendicularly thereto and wherein said first flange portions are positioned in lapped relationship with said joined upper and lower body sections and are secured to said ends of said body sections.

13. A liquid tank as set forth in claim 11 wherein said opposite side walls of said insert includes second flange portions extending substantially perpendicularly thereto and positioned in lapped relationship within said upper and lower body sections adjacent said first and second cut away portions.

14. A liquid tank including first and second body sections, a pair of end caps, first means joining said first and second body sections and said end caps in fluid tight relationship, an insert section in a cut away portion in said tank to provide a recess therein, and second means for securing said insert section to said tank in fluid tight relationship.

References Cited

UNITED STATES PATENTS

| 2,758,845 | 8/1956 | Doyle et al. | 280—164 |
| 3,163,434 | 12/1964 | Krueger | 280—5.12 |

THERON E. CONDON, *Primary Examiner.*

JAMES B. MARBERT, *Examiner.*